United States Patent

[11] 3,552,406

[72] Inventor Ernest E. Whaley
 400 Pleasant Drive, Yorktown, Ind. 47396
[21] Appl. No. 736,221
[22] Filed June 11, 1968
[45] Patented Jan. 5, 1971

[54] BEARING AND FITTING DEVICE AND METHOD
 2 Claims, 4 Drawing Figs.
[52] U.S. Cl..................................................... 134/167,
 134/22
[51] Int. Cl..................................................... B08b 9/00
[50] Field of Search........................................ 134/22,
 22C, 23, 24, 167, 167C, 168, 168C, 169A;
 285/102

[56] References Cited
 UNITED STATES PATENTS
1,356,967 10/1920 DeClairmont................ 134/169X
1,496,104 6/1924 Selden............................ 134/169

| 1,509,327 | 9/1924 | Winchester................... | 134/22 |
| 1,824,095 | 9/1931 | Oles............................... | 134/168 |
| 2,160,214 | 5/1939 | Jackson.......................... | 134/167X |
| 2,425,692 | 8/1947 | Clapp............................. | 285/102 |
| 2,486,113 | 10/1949 | Campbell et al.............. | 285/102 |

Primary Examiner—Joseph Scovronek
Assistant Examiner—Joseph T. Zatarga
Attorney—John H. Widdowson ABSTRACT: A bearing fitting and freeing device having a housing adapted to receive a penetrating oil for injection under air pressure into zerk fittings, bearing devices, or the like to flush out old grease, unfreeze the area and allow new grease to be injected therein. More particularly the freeing device has a main housing assembly adapted to receive air pressure at one end and provided at the opposite end with a flexible discharge hose regulated through a control valve to force fluid contained within the housing assembly outwardly under the air pressure into grease zerks, bearings or the like. The invention also relates to a method of applying penetrating oil under fluid pressure to flush out grease zerks and the like.

PATENTED JAN 5 1971　　　　　　　　　　　　　3,552,406
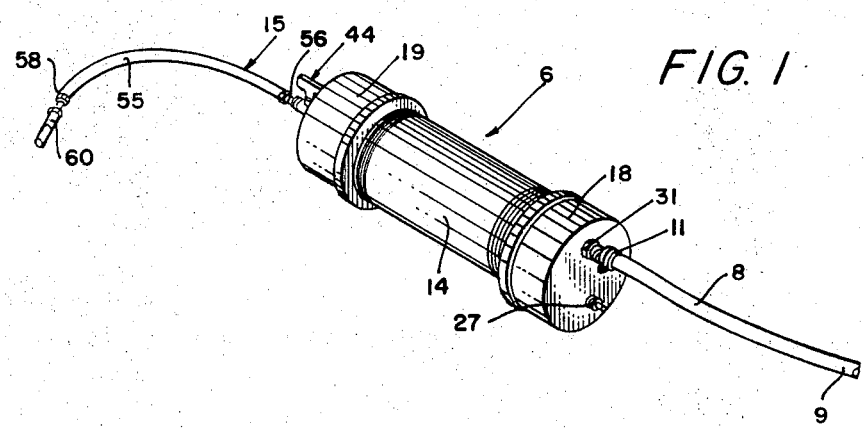
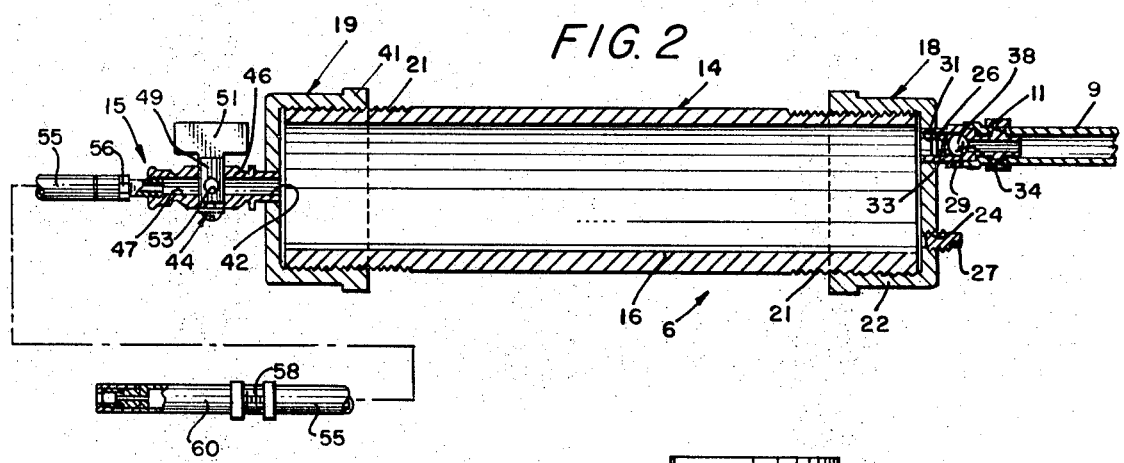
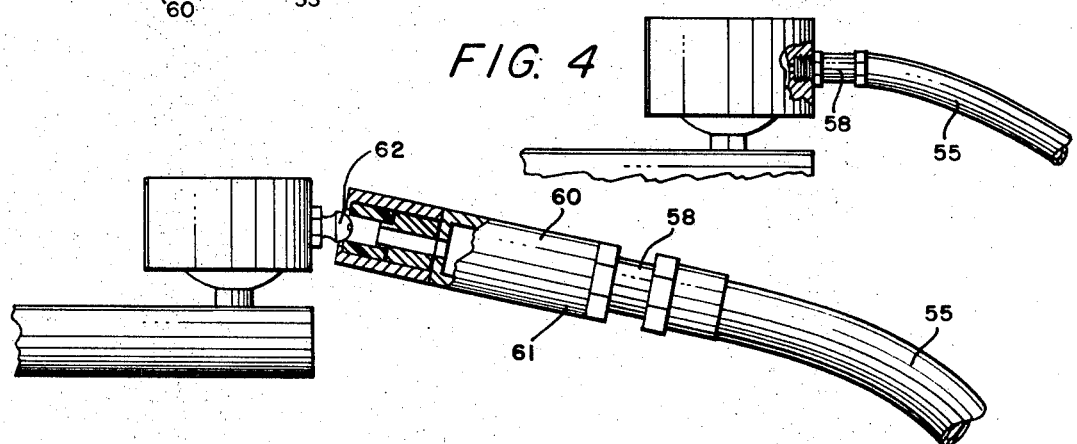
INVENTOR.
ERNEST E. WHALEY
BY
*John H. Widdowson*
ATTORNEYS 3,552,406

BEARING AND FITTING DEVICE AND METHOD

Numerous types of grease gun structures and the like are known in the prior art operable to dispense heavy grease material into grease zerks or the bearing fittings but these devices are limited in operation and are not operable to dispense a cleansing or grease-penetrating fluid therefrom under substantial pressure.

In one preferred embodiment of this invention, a bearing fitting and freeing device is provided including a main housing assembly having an air supply line connected to one end and a flexible discharge assembly connected to the opposite end thereof. The housing assembly is provided with a generally cylindrical main body having opposite ends closed by cap members threadably mounted thereon forming an entrance assembly and a discharge assembly, respectively. The entrance assembly includes the aforementioned cap member mounted thereon having an inlet connector means and a closure plug mounted therein. The connector means includes a check valve operable to permit air flow in one direction into the housing assembly and a snap-on connector assembly adapted to the air supply hose which is conventionally found available in filling station operations or the like. The discharge assembly includes the aforementioned cap member having a control valve assembly mounted thereon so as to receive fluid from within the main body. The control valve assembly includes a turnclock structure having a handle member rotatable to open and close a fluid flow channel therethrough and having an outer discharge opening adapted to threadably receive the flexible discharge assembly. The flexible discharge assembly includes an elongated hose member having one end connected to the control valve assembly and the opposite end having a threaded male coupler with a zerk-fitting device mounted thereon. The zerk-fitting device is adapted to be snapped on a zerk member which is conventionally found in automobiles and other such applications. In the operation and method of the freeing device of this invention, the main body is filled with a penetrating oil such as a hydrocarbon cutting oil through the closure plug and the air supply line is snapped on the connector assembly to supply air pressure thereto normally at 70 to 90 pounds. The zerk-fitting device is snapped on a grease zerk member and the control valve assembly can be operated through the handle member to permit pressure within the main body from the air supply line to be discharged therethrough and into the grease zerk member for cleansing the same of any impurities and/or heavy grease found therein. Additionally, the zerk-fitting device may be threadably removed from the coupler whereupon the coupler may be easily threaded into an opening which previously contained a grease zerk member to provide a greater fluid flow from the cleaning device into the bearing or zerk area being cleansed.

One object of this invention is to provide a freeing device and method overcoming the aforementioned disadvantages of the prior art devices.

Another object of this invention is to provide a freeing device connectable to an air supply line and operable to readily supply penetrating oil under fluid pressure through operation of a control device to flush zerks, bearings, and the like.

One other object of this invention is to provide a freeing device that is simple to operate, economical to manufacture, readily usable only requiring an exterior supply for fluid pressure, and substantially maintenance free.

A still further object of this invention is to provide a method of freeing bearings, zerk-fittings, and the like through the use of a penetrating oil supplied under fluid pressure to cleanse a clogged channel or area.

Various other objects, advantages, and features of the invention will become apparent to those skilled in the art from the following discussion, taken in conjunction with the accompanying drawings in which:

FIG. 1 is a perspective view of the freeing device of this invention as connected to an air supply line;

FIG. 2 is a longitudinal sectional view of the freeing device of this invention;

FIG. 3 is a fragmentary elevational view of the freeing device of this invention as connected to a grease zerk member having portions thereof broken away for clarity; and FIG. 4 is a view similar to FIG. 3 illustrating the connection of the freeing device of this invention through a threaded coupler.

The following is a discussion and description of preferred specific embodiments of the new freeing device of this invention, such being made with reference to the drawings, whereupon the same reference numerals are used to indicate the same or similar parts and/or structures. It is to be understood that such discussion and description is not to unduly limit the scope of the invention.

Referring to the drawings in detail and in particular to FIG. 1, the freeing device of this invention, indicated generally at 6, is shown as attached to an air supply line 8 which is supplied with fluid under pressure, preferably air, through a conventional air compressor mechanism (not shown) that is found in service stations, garages, and the like. The air supply line 8 is constructed of a hose member 9 having a snap-on-type connector 11 attachable to a receiving portion of the freeing device 6 which will be explained.

The freeing device 6 includes a main housing assembly 14 to receive the air supply line 8 connected to one end thereof and the other end is adapted to receive a discharge hose assembly 15 thereon. The housing assembly 14 includes a main body 16 having opposite ends closed by entrance and discharge assemblies 18 and 19, respectively. The main body 16 is of a cylindrical shape having opposite open ends with external threads 21 thereon for reasons to be explained.

The entrance assembly 18 includes a cap member 22 having internal threads to be mounted on the threads 21 of the main body 16 and is provided with a pair of spaced openings 24 and 26 therein. The opening 24 is provided with threads adapted to receive a closure plug 27 which is operable to be removed as required for recharging the main body 16 with oil as will be explained. The other opening 26 is operable to receive a connector means 29 therein having a cylindrical housing 31 with a check valve 33 therein. More particularly, the housing 31 is provided with a seat portion 34 and a stepped portion adapted to receive a spring member 37 to force a ball member 38 into the seat portion 34. It is obvious that this operates to prevent outward flow from within the main body 16 as the ball member 38 rests against the seat portion 34; however, it is obvious that fluid flowing externally against the ball member 38 would force the same inwardly against the spring member 37 to allow fluid pressure to flow therewithin from the air supply line 8.

The discharge assembly 19 includes a cap member 41 also having internal threads engageable with the threads 21 on the main body 16 in a sealed relationship and having a central opening 42 therein receiving a control valve assembly 44 which, in turn, is attachable to the flexible discharge hose assembly 15. The control valve assembly 44 includes a central body 46 with a fluid flow channel 47 having an upright valve member 49 extended transversely of the flow channel 47.

More specifically, the valve member 49 is provided with a handle member 51 integral with an elongated cylindrical portion having a diametrical hold 53 mounted within a hole through the central body 46 extending transversely of the flow channel 47. The handle member 51 is rotatable to move the diametrical hold 53 into and out of alignment with the flow channel 47 to control fluid flow therethrough.

The flexible discharge hose assembly 15 includes a main elongated hose member 55 having a connector member 56 at one end threadably engageable with the central body 46 of the control valve assembly 44 and a similar male coupler member 58 at the opposite end connected to a zerk-fitting device 60. The zerk-fitting device 60 is of an elongated cylindrical housing 61 having a grasping member therein adapted to receive a grease zerk member 62 (FIG. 3) thereabout. The zerk-fitting device 60 is of a substantially conventional structure usable today for a snap-on attachment to the grease zerk member 62 and such as a device manufactured by the Alemete Corp. and disclosed in U.S. Pat. No. 2,486,113 and sold as part no. 308,730. The zerk-fitting device 60 may be readily removed from the male coupler 58 so that the same can be readily threaded into openings which previously contain the grease zerk member 62 as will be explained. Also, it is obvious that various adapters may be attached to the male coupler 58 for threadably placing the same within various sizes of openings as required for cleansing purposes.

In the use and operation of the freeing device 6 of this invention, it is obvious that the housing assembly 14 is filled with a heavy penetrating oil such as a hydrocarbon cutting oil on removal of the closure plug 27 and filling the main body 16 with such liquid. When replacing the closure plug 27, it is obvious that the liquid will not leak from the main body 16 as the check valve 33, closure plug 27, and the control valve assembly 44 (in the closed position) prevents same. The freeing device 6 is thereupon attached to the air supply line 8 through the snap-on connector 11 whereupon air pressure in the line 8 is transmitted through the check valve 33 to the interior of the main body 16 and fluid flow therefrom under the injected air pressure is controlled by operation of the control valve assembly 44. On cleaning the grease zerk member 62, it is obvious that the zerk-fitting device 60 is snapped upon over an outer spherical portion of the zerk member 62 as shown in FIG. 3. Next, the valve member 49 is rotated through the handle member 51 to align the channel 47 and the hole 53 to emit the penetrating oil within the main body 16 under air pressure into the grease zerk member 62. This is very effective in providing a high-pressure source of penetrating oil in order to clean out the grease zerk member 62 which has been frequently found to become frozen through dirt particles or old grease. Additionally, the now common automobile structures are guaranteed and do no require greasing for many thousands of miles, and it is found that it is almost impossible to properly lubricate and grease the automobile without first cleansing the grease zerk members 62 which have become frozen and inoperative.

In some cases as shown in FIG. 4, it is necessary to remove the grease zerk member 62 and readily attach the male coupler 58 into the threaded opening that previously contained the zerk member 62 as the old grease may become extremely tight therewithin. Additionally, it is obvious that such threaded attachment could be used to flush out bearing areas and the like which have become frozen plus the flushing out of the same with a penetrating oil is quite advantageous to long life. There may also be attached various adapters connectable to the male coupler 58 so that the freeing device 6 is readily operable in various usages to provide penetrating oil into frozen areas under considerable pressure for freeing the same.

In the use of the freeing device 6 and a method of cleansing bearing fittings and grease zerks 62, one used the following steps:

1. attaching a fluid supply line to the intake end of the freeing device;
2. providing a light-penetrating oil or hydrocarbon-cutting oil in the interior or housing assembly of the freeing device;
3. attaching a flexible discharge hose assembly of the freeing device through the use of the zerk-fitting device to a grease zerk or bearing to be cleansed;
4. operating the control valve assembly as required to permit discharge of the penetrating oil within the housing assembly of the freeing device through the zerk-fitting device to provide fluid under substantial pressure for cleansing the zerk member;
5. operating the control valve to the off position after cleansing the grease zerk member or bearing; and
6. removing the zerk-fitting device from the zerk member for repeated operation in cleansing other such structures. It is also obvious that the method of this invention may be used on attachment of the flexible discharge assembly by threading means into threaded openings in various areas having old grease frozen for the cleansing thereof.

As will be apparent from the foregoing description of the applicant's freeing device and method, relatively inexpensive means have been provided for cleansing restricted channels, bearing members, grease zerk members, and the like which provides an economical means for cleansing the same with a penetrating oil under fluid pressure. Additionally, the applicant's freeing device is easy to operate, simple and economical in construction, substantially maintenance free, and usable under numerous operating conditions.

While the invention has been described in conjunction with preferred specific embodiments therein, it will be understood that this description is intended to illustrate and not to unduly limit the scope of the invention, which is defined by the following claims.

I claim:

1. A freeing device operable to cleanse out grease, impurities, and the like from restricted areas, comprising:
   a. a housing assembly including a body having entrance and discharge closure assemblies mounted on opposite ends thereof;
   b. said entrance assembly having a first cap member threadably mounted about one end of said body and provided with an opening for recharge purposes and a connector means attached to a pressure supply line;
   c. said discharge assembly including a second cap member threadably mounted about the other end of said body having a control valve mounted thereon connected to a discharge hose assembly;
   d. said discharge hose assembly having a hose member provided with a coupler member attached to a zerk-fitting device for providing fluid flow therefrom;
   e. said zerk-fitting device mountable on a grease zerk member;
   f. said control valve operable to open and close a fluid flow channel to said discharge hose assembly to release penetrating oil contained within said body under fluid pressure through said pressure supply line to flush out the grease zerk member; and
   g. said connector means having a check valve member operable to permit fluid flow inwardly from said pressure supply line but prevent fluid flow inwardly from said pressure supply line but prevent fluid flow from said main body outwardly to said pressure supply line.

2. A freeing device as described in claim 1, wherein:
   a. said control valve having a handle member rotatable to open and close said channel therethrough;
   b. said flexible discharge hose assembly having said zerk-fitting device mountable on the grease zerk member in an enclosing, snapped relationship to control the area in which the fluid is being supplied;
   c. said entrance assembly having a closure plug mounted in said opening to be removed for recharge purposes; and
   d. said housing assembly of light weight construction so as to be readily portable and said control valve in close proximity to said zerk-fitting device so that both items are easily controlled by the operator thereof.